US012600063B2

(12) United States Patent
Neuhofer

(10) Patent No.: US 12,600,063 B2
(45) Date of Patent: Apr. 14, 2026

(54) METHOD FOR TEMPERATURE CONTROL IN A MOLDING TOOL FOR THE PRODUCTION OF MOLDED PARTS FROM A FIBER-CONTAINING MATERIAL AND MOLDING STATION WITH A MOLDING TOOL

(71) Applicant: Kiefel GmbH, Freilassing (DE)

(72) Inventor: Heinz Neuhofer, Freilassing (DE)

(73) Assignee: Kiefel GmbH, Freilassing (DE)

( * ) Notice: Subject to any disclaimer, the term of this patent is extended or adjusted under 35 U.S.C. 154(b) by 99 days.

(21) Appl. No.: 18/666,160

(22) Filed: May 16, 2024

(65) Prior Publication Data

US 2024/0383176 A1 Nov. 21, 2024

(30) Foreign Application Priority Data

May 16, 2023 (DE) ...................... 10 2023 112 895.7

(51) Int. Cl.
*B29C 43/58* (2006.01)
*B29C 43/00* (2006.01)
(Continued)

(52) U.S. Cl.
CPC ............ *B29C 43/58* (2013.01); *B29C 43/003* (2013.01); *D21J 3/00* (2013.01);
(Continued)

(58) Field of Classification Search
CPC ..... B29C 2043/5816; B29C 43/00; D21J 3/00
See application file for complete search history.

(56) References Cited

U.S. PATENT DOCUMENTS 8,268,226 B2 * 9/2012 Vander Wel .............. B30B 1/42
264/296
10,647,030 B2 * 5/2020 Henry ..................... B29C 39/38
(Continued)

FOREIGN PATENT DOCUMENTS

CN 113 308 946 B 9/2022
DE 10056068 C1 * 5/2002 ......... G05D 23/1951
(Continued)

OTHER PUBLICATIONS

Extended European Search Report in Appl. No. 24175324.3 mailed Aug. 4, 2025, 6 pages.
(Continued)

*Primary Examiner* — Atul P. Khare

(74) *Attorney, Agent, or Firm* — Kowert, Hood, Munyon, Rankin & Goetzel, P.C.; Gareth M. Sampson; Dean M. Munyon

(57) ABSTRACT

A method for temperature control in a molding tool is described. The molding tool has a tool base body and at least one cavity. The method includes producing molded parts from a fiber-containing material where a temperature of the molding tool is controlled in operation between a standby temperature and a maximum production temperature of a production temperature range. The standby temperature is lower than a minimum production temperature. The molding tool is kept at a base state by heat input where a molding process is brought from the base state into a production temperature range by an additional heat input. The production temperature range lies between the minimum production temperature and the maximum production temperature. A molding process is started after reaching the minimum process temperature in the molding tool and the additional heat input into the molding tool is maintained only during the molding process.

10 Claims, 5 Drawing Sheets

(51) Int. Cl.

| | | |
|---|---|---|
| *D21J 3/00* | (2006.01) | |
| *B29K 1/00* | (2006.01) | |
| *B29L 31/00* | (2006.01) | |
| *D21J 1/00* | (2006.01) | |

(52) U.S. Cl.
   CPC .. *B29C 2043/5816* (2013.01); *B29K 2001/00*
      (2013.01); *B29L 2031/7132* (2013.01)

(56)                References Cited

U.S. PATENT DOCUMENTS

| | | | |
|---|---|---|---|
| 2012/0164902 A1* | 6/2012 | Wienke ................. | B29C 43/006 |
| | | | 264/103 |
| 2023/0295881 A1* | 9/2023 | Phipps .................... | B65D 1/00 |
| | | | 162/223 |

FOREIGN PATENT DOCUMENTS

| | | | | | |
|---|---|---|---|---|---|
| EP | 4 257 349 | A1 | 10/2023 | | |
| JP | 2007090666 | A * | 4/2007 | | |
| WO | WO-0220666 | A2 * | 3/2002 | ............... | B27N 5/00 |
| WO | WO-2020037443 | A1 * | 2/2020 | ............... | D21J 3/00 |
| WO | 2020/227404 | A1 | 11/2020 | | |
| WO | WO-2023180808 | A2 * | 9/2023 | ............ | D21H 11/18 |

OTHER PUBLICATIONS

Search Report in German Appl. No. 10 2023 112 895.7 mailed Mar. 20, 2024, 4 pages.

\* cited by examiner

180 − 220 °C

T1 Cavity surface temperature

T2 Indirectly heated block, block temperature (responsible for gauge block)

522

521

Cyclical power deduction

Prior art

- - - - T1 Cavity
———— T2 Heating block

T

280 °C
250 °C
220 °C
180 °C

100 °C

Base state | Cycl. Process | Process stop | t

METHOD FOR TEMPERATURE CONTROL IN A MOLDING TOOL FOR THE PRODUCTION OF MOLDED PARTS FROM A FIBER-CONTAINING MATERIAL AND MOLDING STATION WITH A MOLDING TOOL

PRIORITY CLAIM

The present application claims priority under 35 U.S.C. § 119 to German Patent Application No. DE 10 2023 112 895.7, filed May 16, 2023, the disclosure of which is incorporated by reference herein in its entirety.

TECHNICAL FIELD

Methods for temperature control in a molding tool, which has a tool base body and at least one cavity, for producing molded parts from a fiber-containing material and a molding station with at least one molding tool are described.

DESCRIPTION OF RELATED ART

Fiber-containing materials are increasingly used, for example, to produce packaging for food (e.g., trays, capsules, boxes, etc.) and consumer goods (e.g., electronic devices, etc.) as well as beverage containers. Everyday items, such as disposable cutlery and tableware, are also made from fiber-containing material. Fiber-containing materials contain natural fibers or artificial fibers. Recently, fiber-containing material is increasingly used that has or is made of natural fibers that can be obtained, for example, from renewable raw materials or waste paper. The natural fibers are mixed in a so-called pulp with water and optionally further additives, such as starch. Additives can also have an effect on color, barrier properties and mechanical properties. This pulp can have a proportion of natural fibers of, for example, 0.1 to 10 wt. %. The proportion of natural fibers varies depending on the method used for the production of packaging etc. and the product properties of the product to be produced.

The production of fiber-containing products from a pulp generally takes place in several work steps. For this purpose, a fiber processing device has multiple stations or molding stations. In a molding station, for example, fibers can be suctioned in a cavity of a suction tool, thus forming a preform. For this purpose, the pulp is provided in a pulp supply, and the suction tool is at least partially immersed in the pulp with at least one suction cavity whose geometry essentially corresponds to the product to be manufactured. During the immersion, suction takes place via openings in the suction cavity, which are connected to a corresponding suction device, where fibers from the pulp accumulate on the surface of the suction cavity. The suctioned fibers (fiber cake) can subsequently be brought into a pre-pressing tool via the suction tool, and a preform is pre-pressed. For this purpose, for example, it is possible to use elastic mold bodies that are inflated in order to press and, in the process, exert pressure on the preforms. During this pre-pressing process, the fibers in the preform are compressed and the water content of the preform is reduced. After this, preforms are pressed in a hot press to form finished molded parts (hot pressing process). In this process, preforms are inserted into a hot press tool that has, for example, a lower tool half and an upper tool half that are heated. In the hot press tool, the preforms are pressed in a cavity under heat input, with residual moisture being removed by the pressure and heat so that the moisture content of the preforms is reduced from about 60 wt. % before hot pressing to, for example, 5-10 wt. % after hot pressing.

A hot press tool and a manufacturing method using the hot pressing process described above are known, for example, from DE 10 2019 127 562 A1.

In the hot pressing process of fiber processing devices in which wet fiber material is processed (wet fiber process), molding tools made of aluminum are preferred due to their good ratio of heat conduction and strength. However, aluminum materials of any grade have the property of drastically losing their durability and strength properties from approx. 100° C. upwards. Drying processes in such fiber processing devices usually take place at temperatures between 150° C. and 300° C. Any unnecessary overheating of the tool surface inevitably leads to a gradual reduction in strength. In addition, the total time that the aluminum materials remain in these temperature ranges plays a decisive role in the service life of the molding tools.

Unnecessarily allowing the molding tool to remain too hot is therefore to be avoided. Cavities of molding tools in particular are under high load in the hot pressing process, as their contact surfaces and pressure zones are subjected to greater loads (lower surface contact in the force flow of the closing force) than the heating block or the tool base body on which the cavities are arranged and via which the heating takes place.

Up to now, hot pressing stations have used a temperature control system that effectively regulates the temperature of the tool base body and monitors the cavity temperatures in the frame. Since, depending on the heating design, a heating source is located near or far from the tool surface of the molding tool, the temperature control reacts with different speeds to the changing temperatures at the cavity after the process starts.

In principle, the heat flow that occurs during the process (heat reduction due to drying of the product) results in a temperature distribution on the molding tool that is completely different from the temperature distribution of a base state. The temperature distribution here is the result of the heat flow, where the heat flow is the result of a contour-following cooling of the surface or drying of the product.

Until now, it was assumed that higher temperatures in the hot pressing process generally also enable better energy transfers. Accordingly, the highest possible temperatures were already realized for the process start in the base state. As the (continuous) process progresses, the temperature drops due to the oscillating heat extraction (energy extraction) at the cavities and a continuous heat flow from the heating source (cartridges) to the heat sink (cavity) is established. Over the course of the heat flow, the temperature control registers the temperature change and reacts to this change by increasing the heating power. The further cyclical temperature drop compared to the initial state is now intercepted and becomes macroscopically visible as a "dent" in the overall curve (see FIG. 4). The cavity surface temperature now differs significantly from that in the base state. In a process stop, the power input is now stopped and the energy underway in the heat flow is passed on to the heat sink. This results in a so-called reflow of energy and the cavity temperature rises significantly (depending on the energy flowing, in a manner depending on the product).

Depending on the distance between the heating source and the surface, there are reaction dead times for the temperature when power is input. For this reason, a percentage of the installed heating power is currently maintained at the start of the process in order to keep the temperature drop low during a continuous cycle. However, it can happen, especially when starting up the products, that the user stops multiple times due to small process errors and starts again shortly afterwards. Each time the products are restarted, an energy boost (pre-stop) is emitted to the cavity in the form of heating power, but this is not absorbed by the products (in the process stop), which causes the cavity to strongly overheat (see FIG. 5). As soon as the hot pressing process is restarted because all process parameters are OK, the process starts with an overheated molding tool. Within a few cycles, the temperature of the cavity drops again, but the temperature of the tool base body is still high enough to prevent the control system from intervening. This results in severe undercooling of the cavities, so that the process is permanently unstable and is able to settle down only after some hours. This has a negative impact on product quality, as no cycle is the same as the preceding one in terms of energy transfer.

SUMMARY

Object

In contrast thereto, it is an object of the present disclosure to specify a solution that solves the problems of the prior art and provides a reduction in the start-up times of hot pressing processes, where a hot pressing process can be started in a short time and without significant waste.

Solution

The above-mentioned object is achieved by a method for temperature control in a molding tool, which has a tool base body and at least one cavity, for the production of molded parts from a fiber-containing material, where preforms with a moisture content greater than 30 wt. % are pressed to form molded parts under pressure and temperature input, where the temperature of the molding tool can be controlled in operation between a standby temperature and a maximum production temperature of a production temperature range, where the standby temperature is lower than a minimum production temperature, where the molding tool is kept at a base state by heat input, where a molding process is brought from the base state, in which the molding tool has at least the standby temperature, into a production temperature range by an additional heat input, where the production temperature range lies between the minimum production temperature and the maximum production temperature, where a molding process is started after reaching the minimum process temperature in the molding tool and the additional heat input into the molding tool is maintained only during the molding process.

This provides a temperature control that makes it possible to start a hot pressing process (molding process) from a base state, where only a relatively low heat input is required. In contrast to the prior art, the temperature in the molding tool or in the tool base body is not brought to the maximum production temperature right at the start of the molding process, but only during the transition from the base state to a production state, so that there is no sharp drop in the surface temperature of the at least one cavity. Rather, the surface temperature of the at least one cavity has, relatively early or immediately after the transition from the base state to the production state, a temperature that is sufficient for the molding process and is only reached after several hours in the prior art.

In further embodiments, the heat input to reach the base state and the additional heat input to reach a production temperature within the production temperature range can be achieved by heating the tool base body.

In further embodiments, during an interruption of the molding process, the additional heat input into the molding tool can be interrupted and the molding tool can be cooled for the duration of the interruption. Cooling makes it easy to keep the molding tool within the production temperature range. The cooling replaces the natural cooling that would be provided by moist preforms. Accordingly, the cooling is determined according to the required cooling capacity. Cooling can be achieved, for example, by supplying air to the molding tool. The process or cooling air introduced flows through, for example, secondary air ducts for venting the molding tool or intake ducts of the mold tool for suctioning out water vapor generated during a hot pressing process. For this purpose, a cooling device can have for example a fan that can reach different pressure states and speeds depending on the operating mode and controlling.

In further embodiments, after completion of a molding process for transferring the molding tool to the base state, the additional heat input into the molding tool can be interrupted and the molding tool can be cooled until the molding tool approaches the standby temperature. Here the molding tool does not have to be cooled until it has reached the standby temperature.

In further embodiments, the production temperature range can include a temperature range in which the molding tool has a gauge block temperature at which a transfer of preforms to be pressed takes place which have a temperature below the standby temperature. The gauge block temperature is of decisive importance for the entire manufacturing process and the molding process. As long as the molding tool has a gauge block temperature, moist preforms can be transferred via other tools, for example, where both the preforms and a transfer tool are significantly cooler than the molding tool. The key factor here is the tool expansion of the molding tool, which has an optimum expansion within the gauge block temperature range.

In further embodiments, the minimum production temperature can be a lower gauge block temperature and the maximum production temperature can be an upper gauge block temperature of the molding tool.

In further embodiments, at least the temperature at the at least one cavity and the temperature at the tool base body can be measured in order to detect a heat transfer and to control the heat input.

In further embodiments, a heat flow can be determined in advance in a reference operation of the molding tool, which flow depends on the product or molded part to be manufactured and is used as a reference for corresponding molding processes.

In further embodiments, a molding process can be started immediately starting from the base state of the molding tool if the temperature of the molding tool is greater than or equal to the minimum production temperature. The molding process is started immediately without a start-up time and the molded parts manufactured in the molding process have the same properties compared to subsequent molded parts produced in subsequent processes.

The above-mentioned object is also achieved by a molding station with at least one molding tool, which has a tool base body and at least one cavity arranged on the tool base body, for the production of molded parts from a fiber-containing material, where preforms with a moisture content greater than 30 wt. % are pressed to form molded parts under pressure and temperature input, further including at least one heating device arranged in the tool base body and at least one cooling device, where the temperature of the molding tool can be controlled in operation between a standby temperature and a maximum production temperature of a production temperature range via the at least one heating device and the at least one cooling device, where the standby temperature is lower than a minimum production temperature, further including at least one first sensor element and at least one second sensor element for detecting the temperature of the tool base body and the at least one cavity, where the molding tool can be brought to a base state by heat input and a molding process can be brought from the base state, in which the molding tool has at least the standby temperature, into a production temperature range by an additional heat input, where the production temperature range lies between the minimum production temperature and the maximum production temperature, where a molding process can be started after reaching the minimum process temperature in the molding tool and the at least one heating device is designed to maintain the additional heat input into the molding tool only during the molding process.

Advantages

Stable running from cycle 1
Increase in productivity
Reduction of downtimes due to process errors
Increased tool life and protection against thermal fatigue
Alignment of product qualities at the beginning and during the process
The above embodiments and advantages are also achieved with a molding station (hot pressing station) described herein.

Further features, embodiments and advantages result from the following illustration of exemplary embodiments with reference to the figures.

DETAILED DESCRIPTION

Various embodiments of the technical teaching described herein are shown below with reference to the figures. Identical reference signs are used in the figure description for identical components, parts and processes. Components, parts and processes that are not essential to the technical teachings disclosed herein or that are obvious to a person skilled in the art are not explicitly reproduced. Features specified in the singular also include the plural unless explicitly stated otherwise. This applies in particular to statements such as "a" or "one."

Figure 1:
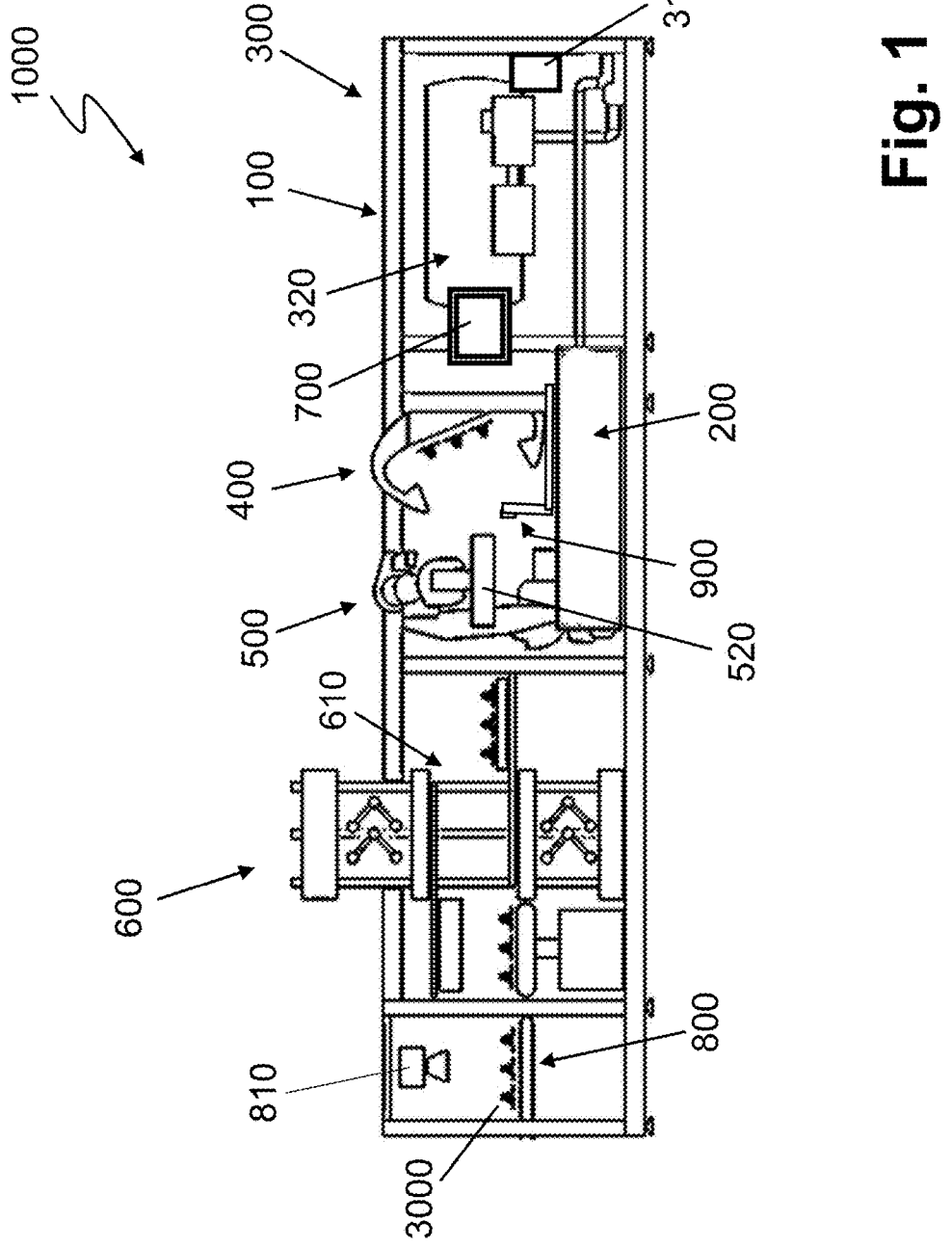
FIG. 1 depicts a schematic representation of a fiber processing device, according to some embodiments.

FIG. 1 shows a schematic representation of a fiber processing device 1000 for producing three-dimensional molded parts from a fiber-containing material, according to some embodiments. In the illustrated embodiment, the fiber-containing material for the production of molded parts is processed in a pulp tank 200 of the fiber processing device 1000. For this purpose, water and fibrous materials as well as additives, if any, can be introduced into a pulp tank 200 via a liquid supply, and the pulp can be prepared in the pulp tank 200 by mixing the individual components with heat input and by auxiliary means, such as an agitator.

Pulp refers to an aqueous solution containing fibers, where the fiber content of the aqueous solution can be in a range of 0.1 to 10 wt. %. In addition, additives such as starch, chemical additives, wax, etc. can be present. The fibers can be, for example, natural fibers, such as cellulose fibers, or fibers from a fiber-containing original material (for example waste paper). A fiber treatment plant offers the possibility of preparing pulp in a large quantity and providing pulp to several fiber processing devices 1000.

The fiber processing device 1000 can be used to produce, for example, biodegradable cups 3000, capsules, trays, plates, and other molded and/or packaged parts (e.g., as holder/supporting structures for electronic appliances). Since a fibrous pulp with natural fibers is used as the starting material for the products, the products manufactured in this way can themselves be used as a starting material for the manufacture of such products after their use, or they can be composted, because they can usually be completely decomposed and do not contain any substances that are harmful to the environment.

The fiber processing device 1000 shown in FIG. 1 has a frame 100 that can be surrounded by a cladding. The supply units 300 of the fiber processing device 1000 include, for example, interfaces for the supply of media (for example, water, pulp, compressed air, gas, etc.) and energy (power supply), a central control unit 310, at least one suction device 320, line systems for the various media, pumps, valves, lines, sensors, measuring devices, a bus system, etc., and interfaces for bidirectional communication via a wired and/or wireless data connection. Instead of a wired data connection, there can also be a data connection via a fiber optic line. The data connection can be, for example, between the control unit 310 and a central controller for multiple fiber processing devices 1000, to a fiber preparation plant, to a service point, and/or further devices. It is also possible to control the fiber processing device 1000 via a bidirectional data connection via a mobile device, such as a smartphone, tablet computer, or the like.

The control unit 310 is in bidirectional communication with an HMI panel 700 via a bus system or a data connection. The HMI (Human Machine Interface) panel 700 has a display that displays operating data and states of the fiber processing device 1000 for selectable components or the entire fiber processing device 1000. The display can be designed as a touch display so that adjustments can be made manually by an operator of the fiber processing device 1000. Additionally or alternatively, further input means, such as a keyboard, a joystick, a keypad, etc. for operator inputs, can be provided on the HMI panel 700. In this way, settings can be changed and the operation of the fiber processing device 1000 can be influenced.

The fiber processing device 1000 has a robot 500. The robot 500 is designed as a so-called 6-axis robot and is thus able to pick up parts within its radius of action, to rotate them and to move them in all spatial directions. Instead of the robot 500 shown in the figures, other handling devices can also be provided that are designed to pick up and twist or rotate products and move them in the various spatial directions. In addition, such a handling device may also be otherwise configured, in which case the arrangement of the corresponding stations of the fiber processing device 1000 may differ from the illustrated embodiment.

A suction tool 520 is arranged on the robot 500. In the illustrated embodiment, the suction tool 520 has cavities formed as negatives of the three-dimensional molded parts to be formed, such as of cups 3000, as suction cavities. The cavities can have, for example, a net-like surface on which fibers from the pulp are deposited during the suction. Behind the net-like surfaces, the cavities are connected to a suctioning device via channels in the suction tool 520. The suction device can be realized, for example, by a suction device 320. Pulp can be suctioned in via the suction device when the suction tool 520 is located within the pulp tank 200 in such a way that the cavities are at least partially located in the aqueous fiber solution, the pulp. A vacuum, or a negative pressure, for suctioning fibers, when the suction tool 520 is located in the pulp tank 200 and the pulp, can be provided via the suction device 320. For this purpose, the fiber processing device 1000 has corresponding means at the supply units 300. The suction tool 520 has lines for providing the vacuum/negative pressure from the suction device 320 in the supply units 300 to the suction tool 520 and the openings in the cavities. Valves are arranged in the lines, which can be controlled via the control unit 310 and thus regulate the suction of the fibers. It is also possible for the suction device 320 to perform a "blow-out" instead of a suction, for which purpose the suction device 320 is switched to another operating mode in accordance with its design.

In the production of molded parts made of a fiber material, the suction tool 520 is immersed in the pulp and a negative pressure/vacuum is applied to the openings of the cavities so that fibers are suctioned out of the pulp and are deposited for example on the net of the cavities of the suction tool 520.

Thereafter, the robot 500 lifts the suction tool 520 out of the pulp tank 200 and moves said tool together with the fibers that are adhering to the cavities and still have a relatively high moisture content of, e.g., over 80 wt. % water, to the pre-pressing station 400 of the fiber processing device 1000, the negative pressure being maintained in the cavities for the transfer. The pre-pressing station 400 has a pre-pressing tool with pre-pressing molds. The pre-pressing molds can be formed, for example, as positive of the molded parts to be manufactured and have a corresponding size with regard to the shape of the molded parts for receiving the fibers adhering in the cavities.

In the production of molded parts, the suction tool 520 is moved, with the fibers adhering in the cavities, to the pre-pressing station 400 in such a way that the fibers are pressed into the cavities. The fibers are pressed together in the cavities, so that a stronger connection is thereby produced between the fibers. In addition, the moisture content of the preforms formed from the suctioned-in fibers is reduced, so that the preforms formed after the pre-pressing only have a moisture content of, for example, 60 wt. %. To squeeze out water, flexible pre-pressing molds can be used, which are inflated, for example, by means of compressed air (process air), thereby pressing the fibers against the wall of a cavity of a further suction tool part. As a result of the "inflation," both water is squeezed out, and the thickness of the sucked-in fiber layer is reduced.

During pre-pressing, liquid or pulp can be extracted and returned via the suction tool 520 and/or via further openings in pre-pressing molds or pre-pressing tool parts (cavities). The liquid or pulp discharged during suction via the suction tool 520 and/or during pre-pressing in the pre-press station 400 can be returned to the pulp tank 200.

After pre-pressing in the pre-pressing station 400, the thus produced preforms on the suction tool 520 are moved by the robot 500 to a hot pressing station 600, which is also designated as a molding tool for the final shaping and drying of the preforms to form products or molded parts. For this purpose, the negative pressure is maintained at the suction tool 520 so that the preforms remain in the cavities. The preforms are transferred via the suction tool 520 to a lower tool base body that can be moved along the production line out of the hot pressing device 610. If the lower tool base body is in its extended position, the suction tool 520 is moved to the lower tool base body in such a way that the preforms can be placed on molding devices of the lower tool base body. Subsequently, an overpressure is produced via the openings in the suction tool 520 so that the preforms are actively deposited by the cavities in the suction tool, or the suction is ended, so that the preforms remain on the molding devices or cavities of the lower tool base body due to gravity. By providing overpressure at the openings of the cavities of the suction tool, pre-pressed preforms, which rest/adhere in the cavities of the suction tool, can be released and dispensed.

Thereafter, the suction tool 520 is moved away via the robot 500 and the suction tool 520 is dipped into the pulp tank 200 in order to suction further fibers for the production of molded parts from fiber-containing material.

After the transfer of the preforms, the lower tool base body moves into the hot pressing station 600. In the hot pressing station 600, the preforms are pressed into finished molded parts under heat input and high pressure, for which purpose an upper tool base body is brought onto the lower tool base body via a press. The upper tool base body has cavities corresponding to the cavities or molding devices. After the hot pressing operation, the lower tool base body and the upper tool base body are moved away relatively from one another and the upper tool base body is moved along the fiber processing device 1000 in the manufacturing direction, where after the hot pressing the manufactured molded parts are suctioned in via the upper tool base body and thus remain within the cavities. Thus, the manufactured molded parts are brought out of the hot pressing station 600 and deposited via the upper tool base body after the deposition on a transport belt of a conveying device 800. After the deposition, the suction via the upper tool base body is ended and the molded parts remain on the transport belt. The upper tool base body moves back into the hot pressing station 600 and a further hot pressing operation can be carried out.

The fiber processing device 1000 further has a conveying device 800 with a transport belt. The manufactured molded parts made of fiber-containing material can be placed on the transport belt after the final molding and the hot pressing in the hot pressing station 600 and discharged from the fiber processing device 1000. In further embodiments, after placing the molded parts on the transport belt of the conveying device 800, further processing can take place, such as filling and/or stacking the products. The stacking can take place, for example, via an additional robot or another device.

The fiber processing device 1000 from FIG. 1 shows a possible embodiment. A fiber processing device according to the technical teaching described herein can also have only one molding station with a replaceable tool, e.g., a suction tool 520 or a hot press tool, in which fiber-containing material can be processed, it being possible for different tools for producing different three-dimensional molded parts to be received in the at least one molding station. The further stations and devices shown for the fiber processing device 1000 of FIG. 1 are not absolutely necessary for implementing the technical teaching.

Figure 2:
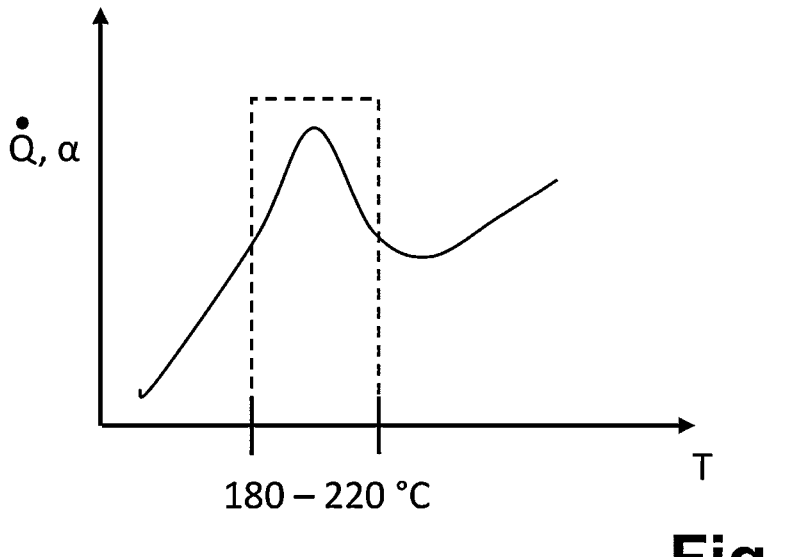
FIG. 2 depicts a schematic representation of the qualitative application of the efficiency of heat transfer in cavities of a molding tool, according to some embodiments.

FIG. 2 shows a schematic representation of the qualitative application of the efficiency of heat transfer in cavities of a molding tool, according to some embodiments, where the optimum temperature range for pressing or hot pressing of fiber-containing preforms is between 180 and 220° C. It is therefore crucial that during a molding process (hot pressing process), the surface temperature of the cavities of the molding tool is not heated above the maximum temperature (220° C. in this case), as this would result in damage to the preforms, uneven molding across the cavities of a multi-cavity molding tool, and a sharp drop in temperature in the molding tool.

Figures 3, 4:
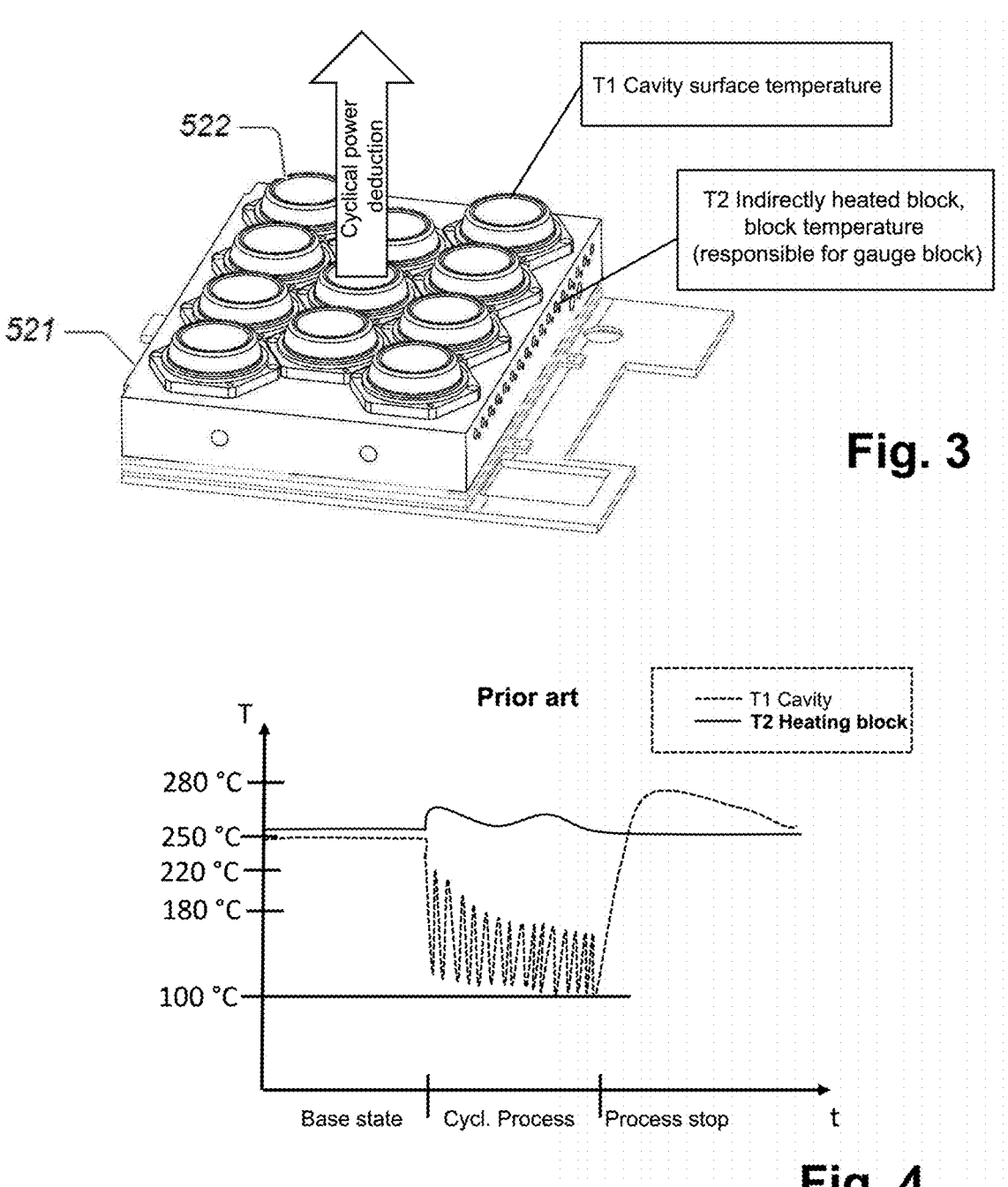
FIG. 3 depicts a schematic representation of a molding tool, according to some embodiments.
FIG. 4 depicts a schematic representation of a temperature control system according to the prior art.

FIG. 3 shows a schematic representation of a tool base body 521 of a molding tool with cavities 522 arranged on it, according to some embodiments. The tool base body 521 can be heated, for example, using heating cartridges that can be controlled electrically. Other heating devices (e.g. inductive, fluidic, or pneumatic heating) can also be used in other embodiments.

Figure 5:
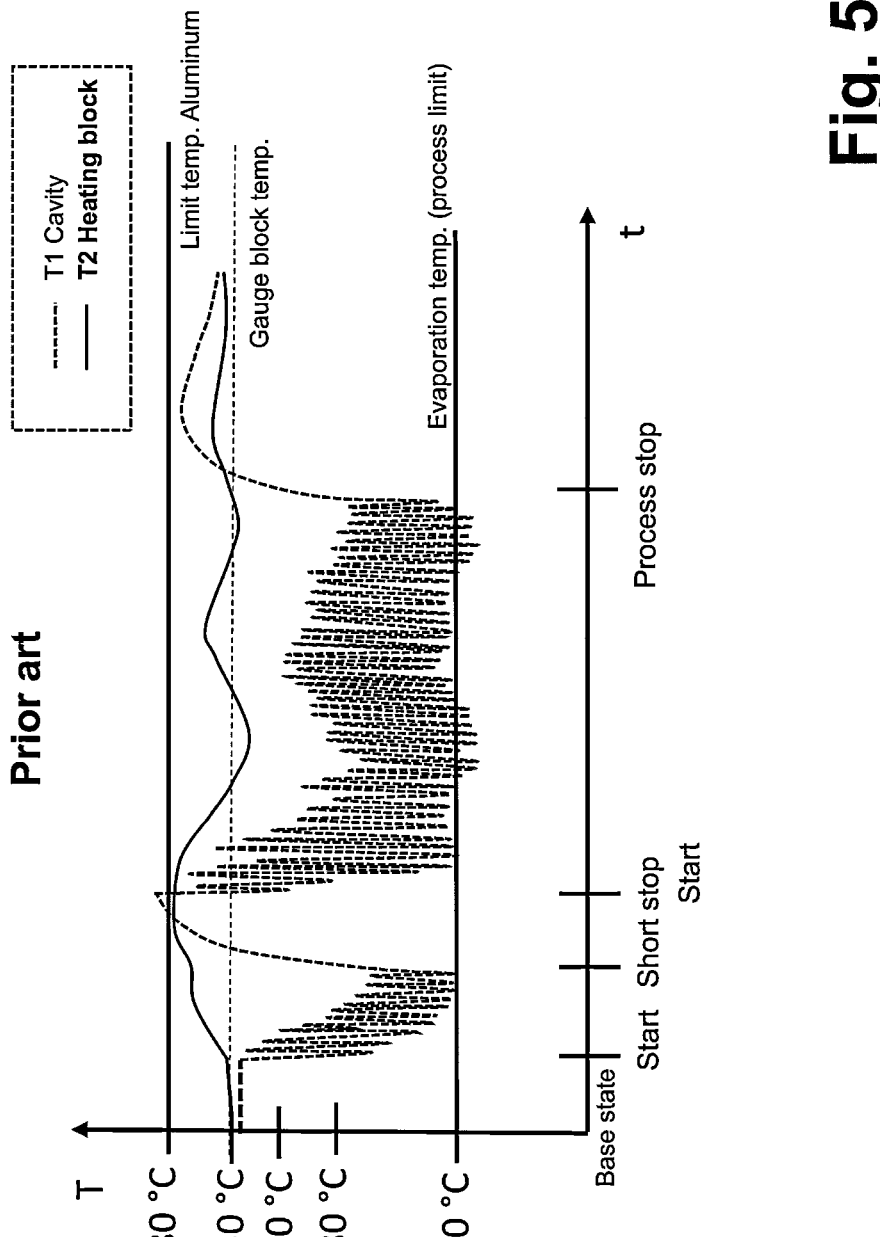
FIG. 5 depicts a schematic representation of a further temperature control system according to the prior art.

FIG. 4 shows a schematic representation of a temperature control system according to the prior art, where the surface temperature of the cavities is initially brought very high, up to 250° C., in order to counteract cooling due to the placement of moist preforms on them. However, this leads to the disadvantages and problems described above. The same applies to the schematic representation of a further temperature control system according to the prior art shown in FIG. 5, where a short stop has a massive effect on the temperature curve and in particular the surface temperature of cavities.

Figure 6:
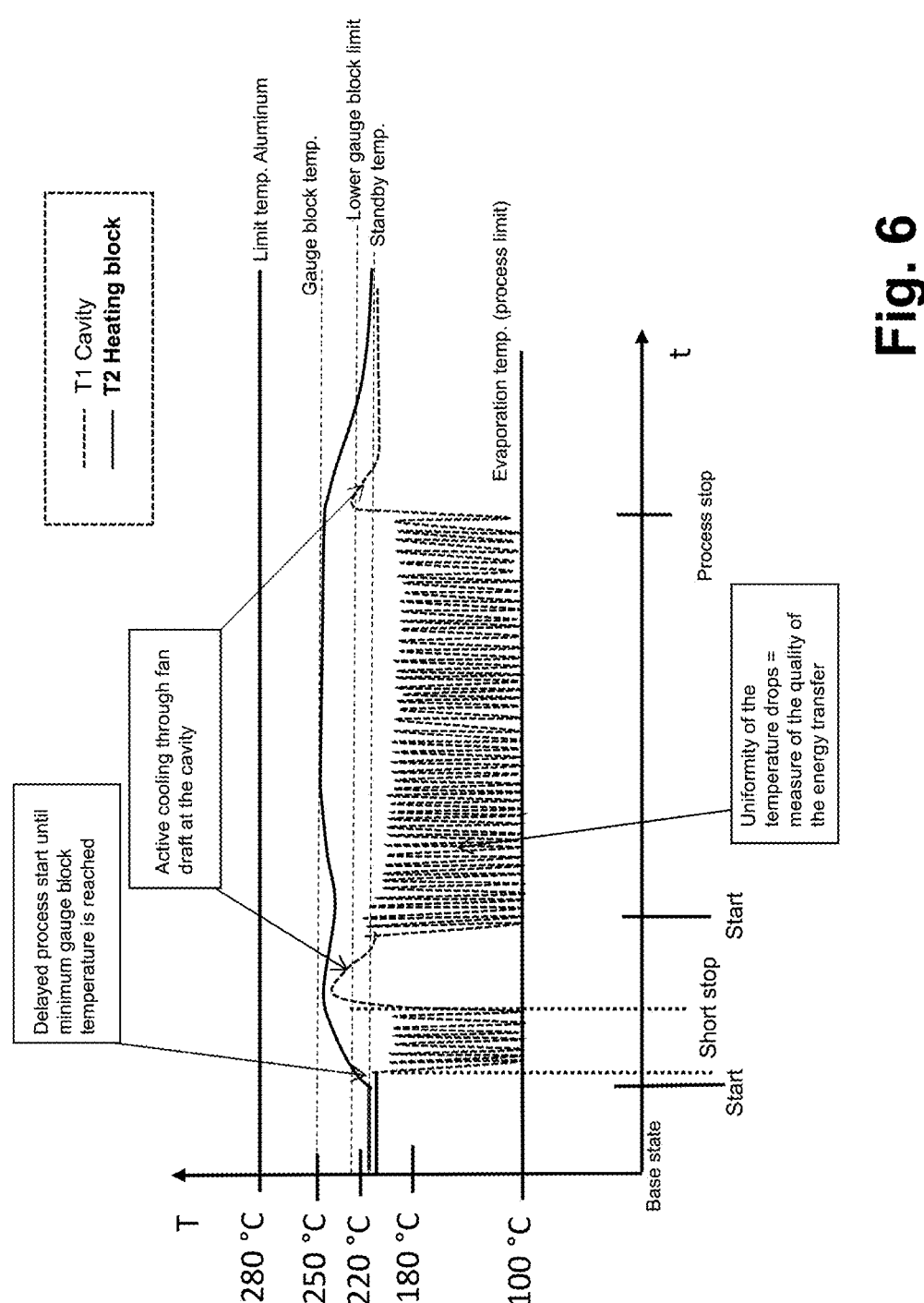
FIG. 6 depicts a schematic representation of a temperature control system according to the technical teaching described herein.

FIG. 6 shows a schematic representation of a temperature control system according to the technical teaching described herein, where the problems and disadvantages of the prior art are eliminated.

The energy flow itself, i.e. the heat flow, is monitored and controlled for example by measuring the temperatures T1 and T2. This requires for example at least two temperature sensors at representative points of the source (tool base body) and sink (cavity).

Furthermore, the information about the heat flow that is established (in product-dependent fashion) can be used additionally or alternatively. The product-dependent heat flow can be determined by recording via a reference run. In this type of controlling, a sensor system can be suitably designed and positioned for each tool.

Basically, each type of pulp material used in a fiber molding device 1000 (wet fiber system) has a common maximum effective evaporation temperature (see FIG. 2), which should not be exceeded. Above this temperature range, the vapor cushion that occurs blocks the effective heat transfer, similar to a dancing bead of water on a too-hot hotplate (Leidenfrost effect).

Furthermore, there is a minimum temperature range that should not be undershot for effective vaporization on the contact surface of the tool and material. It would therefore not be useful to start a molding process with excessively high temperatures, as in the prior art, since the process changes cyclically until the effective temperatures level off. In addition, as stated at the beginning, it is negative with regard to the material used in the molding tool if the cavities unnecessarily remain in excessively hot base states, especially if the fiber molding device 1000 or the molding station (hot pressing station 600) with the molding tool (as is known) does not go into operation for several hours.

The methodology described herein takes full account of the above-mentioned aspects and permanently prevents overheating of the surface temperatures of the cavities. In addition, by using this methodology, the cyclical process can start from a cooler state without major temperature fluctuations and the surface temperatures of the cavity are, starting from the first cycle, in a range that in the prior art they will reach (anyway) only after a number of cycles. The quality of the first products therefore no longer differs from the products after some time. The control system described above makes possible a "cold start" of the hot pressing process.

The process start begins from a cooler standby temperature with the methodology described. In contrast to the previous temperature controlling according to the prior art, the cavities no longer overheat and the durability is substantially increased. Damage to the cavities caused by excessively high temperatures therefore no longer occurs.

In addition, a cooling device, such as a speed-controlled fan that provides an air supply into the molding tool, can be used as an active cooler during an unforeseen process stop in order to remove the heat boost, still on the way, from the cavity as cooling capacity even without product, and to lower the temperatures back to at least the base/standby state.

At the start of the molding process, the balanced "cold" standby state (<230° C.) is raised as usual by power input (heat), so that a heat flow is formed that corresponds approximately to the heat flow that the molding process later requires anyway. Here the temperature of the tool base body rises to its gauge block temperature and expansion (so that the cold suction tool meets the hot pressing tool). Waiting for this time duration has to take place in order to start the cycle (max. 1-2 min). However, once the molding station has been "woken up" or is still within a tolerable temperature range around the gauge block temperature (e.g. +/−15° C.) after the process stop, a restart can take place without waiting.

For this purpose, it is necessary to specify a standby temperature and a production temperature or a production temperature range. When the molding station is switched on, the effective temperatures of the components of the molding tool only move between the two temperatures, i.e. neither above nor below them. In the process stop, a cooling device (e.g. fan) is automatically switched on, whereby cooling air (ambient air) is drawn through the steam holes in the cavity until a temperature close to the standby temperature is reached (effective cavity cooling). The gauge block temperature is monitored here so that the molding process can be restarted at any time if the current tool base body temperature (block temperature) is still within a range around the gauge block temperature, while overheating is nevertheless ruled out.

This provides a solution that prevents the cavities from overheating with smooth running of the process from cycle 1. This results in stable product quality and efficient energy yield. Furthermore, the intervals at which the cavities have to be replaced due to temperature-related damage (service life) are significantly extended. The service life of the aluminum is also increased and there is no temperature-related damage to the product (burning/steam cracking) starting from cycle 1.

LIST OF REFERENCE SIGNS

100 Frame
200 Pulp tank

300 Supply units
310 Control unit
320 Suction device
400 Pre-pressing station
500 Robot
520 Suction tool
521 Tool base body
522 Cavities
600 Hot pressing station
610 Hot pressing device
700 HMI panel
800 Conveying device
810 Camera
900 Heat exchanger
1000 Fiber processing device
3000 Cup

The invention claimed is:

1. A method for temperature control in a molding tool, the molding tool having a tool base body and at least one cavity, for production of molded parts from a fiber-containing material, wherein preforms with a moisture content greater than 30 wt. % are pressed in a molding process to form molded parts under pressure and temperature input, wherein a temperature of the molding tool is controlled in operation between a standby temperature and a maximum production temperature of a production temperature range, wherein the standby temperature is lower than a minimum production temperature, wherein the molding tool is kept at a base state by heat input before the molding process, wherein for the molding process the molding tool is brought from the base state, in which the molding tool has at least the standby temperature, into the production temperature range by an additional heat input, wherein the production temperature range lies between the minimum production temperature and the maximum production temperature, and wherein the molding process is started after reaching the minimum production temperature in the molding tool and the additional heat input into the molding tool is maintained only during the molding process, after which the molding tool is transferred back to the base state.

2. The method according to claim 1, wherein the heat input to reach the base state and the additional heat input to reach a production temperature within the production temperature range is carried out by heating the tool base body.

3. The method according to claim 1, wherein during an interruption of the molding process, the additional heat input into the molding tool is interrupted and the molding tool is cooled for a duration of the interruption.

4. The method according to claim 1, wherein after completion of a molding process and for transferring the molding tool back to the base state, the additional heat input into the molding tool is interrupted and the molding tool is cooled until the molding tool approaches the standby temperature.

5. The method according to claim 1, wherein the production temperature range comprises a temperature range in which the molding tool has a gauge block temperature at which a transfer of the preforms to be pressed into the molding tool takes place, the preforms having a temperature below the standby temperature.

6. The method according to claim 1, wherein the minimum production temperature is a lower gauge block temperature and the maximum production temperature is an upper gauge block temperature of the molding tool.

7. The method according to claim 1, wherein at least the temperature at the at least one cavity and the temperature at the tool base body are measured.

8. The method according to claim 1, wherein a heat flow is determined in advance in a reference operation of the molding tool.

9. The method according to claim 1, wherein the molding process is started immediately starting from when the temperature of the molding tool is greater than or equal to the minimum production temperature.

10. A molding station for performing the method according to claim 1, wherein the molding station includes at least the molding tool, the molding tool having the tool base body and the at least one cavity arranged on the tool base body, further comprising at least one heating device arranged in the tool base body and at least one cooling device, wherein a temperature control system of the molding station is configured to control the temperature of the molding tool in operation between the standby temperature and the maximum production temperature of the production temperature range via the at least one heating device and the at least one cooling device, further comprising at least one first sensor element and at least one second sensor element for detecting the temperature of the tool base body and the at least cavity, wherein the temperature control system is further configured such that the molding tool is brought to the base state by heat input and the molding tool is brought from the base state, in which the molding tool has at least the standby temperature, into the production temperature range by the additional heat input for performing the molding process in which the preforms are pressed, after which the molding tool is transferred back to the base state.

* * * * *